J. D. VAN BENTHUYSEN.
Nut-Lock.

No. 215,779. Patented May 27, 1879.

WITNESSES.
J. C. Hubbell
P. J. Finney

INVENTOR.
J. D. Van Benthuysen
BY H. N. Jenkins
ATTORNEY.

UNITED STATES PATENT OFFICE

JOSEPH D. VAN BENTHUYSEN, OF NEW ORLEANS, LOUISIANA.

IMPROVEMENT IN NUT-LOCKS.

Specification forming part of Letters Patent No. 215,779, dated May 27, 1879; application filed February 24, 1879.

*To all whom it may concern:*

Be it known that I, JOSEPH DAVIS VAN BENTHUYSEN, a resident of the city of New Orleans, parish of Orleans, and State of Louisiana, have invented a certain new and useful Improvement in Lock-Nuts; and I do hereby declare the following to be a full, clear, and correct description of the same, reference being had to the annexed drawings, making a part of this specification.

This invention relates to a simple device by which the nuts of screw-bolts are effectually prevented from being accidentally loosened or unscrewed. It is more especially intended for use in connection with fish-bars, for securing together the ends of railroad-rails; but it may be used for locking nuts on bolts when applied to machinery, bridges, and other purposes.

Figure 1:
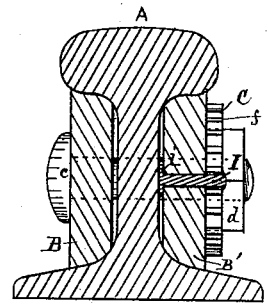
Figure 2:
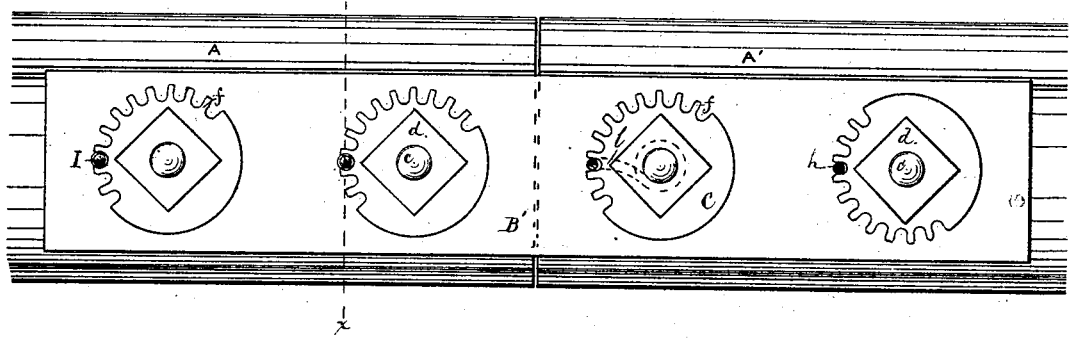
Figure 3:
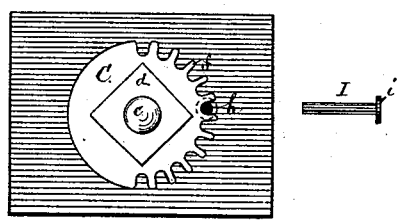

On the drawings, Figure 1 is a cross-section of a railroad-rail with fish-bars and locking device complete, the section being made through the line $x\ x$ of Fig. 2. The latter represents a side elevation of same; and Fig. 3 shows the invention as applied to other articles.

A A' are the ends of rails, and B B' ordinary fish-bars, as when secured by the usual number of bolts $c$ and nuts $d$.

My locking device consists of a flat circular washer, C, having a central hole of same form, but slightly larger, than the diameter of the nut to be locked, so that it may be freely slipped on or off the same. The outer edge of this washer is provided for a certain distance, or all around, if desired, with teeth, as at $f$; and the fish-bar or other article against which the nut and washer rest is provided, at a distance from the center of each bolt-hole equal to the radius of the pitch-circle of the washer, with a small hole, $h$, for the reception of a pin, I, the latter furnished with a head, $i$, and, when used in connection with fish-bars, inserted in the hole $h$ from the inner side of the bar before it is placed in position.

The shank of the pin should exceed in length the combined thickness of a fish-bar and washer, in order that its projecting end may be straddled by two of the teeth of the washer, over which its point is afterward riveted.

If preferred, the pin can be inserted from the outer side after the washer has been placed in proper position, and secured therein by hammering until its point has been sufficiently flattened against the rail or other backing to prevent its withdrawal. Another plan is to tap the hole and screw the pin into same.

The nut and washer may be constructed in one piece instead of two, as above described. This, however, will necessitate the production of teeth entirely around the same.

Having described my invention, what I claim as new, and desire to secure by Letters Patent, is—

The combination of bolt $c$, nut $d$, locking-pin I, and disk C, having a segmental series of teeth, $f$, substantially as set forth.

In testimony whereof I have hereunto signed my name.

J. D. VAN BENTHUYSEN.

In presence of—
J. N. MÜLLER,
P. J. FINNEY.